United States Patent [19]

DeMoss et al.

[11] 4,345,285

[45] Aug. 17, 1982

[54] FLOPPY PACK WITH VARIABLY-SPACED ISOLATION MEANS

[75] Inventors: Dean DeMoss, Camarillo; Harvey J. Richardson, Sepulveda, both of Calif.

[73] Assignee: Burroughs Corporation, Detroit, Mich.

[21] Appl. No.: 172,234

[22] Filed: Jul. 25, 1980

Related U.S. Application Data

[63] Continuation-in-part of Ser. No. 156,197, Jun. 3, 1980.

[51] Int. Cl.³ ..................... G11B 23/02; G11B 5/016
[52] U.S. Cl. ..................................... 360/133; 360/99
[58] Field of Search ................... 360/133, 135, 99, 98, 360/97, 132, 131

[56] References Cited

U.S. PATENT DOCUMENTS

| | | | |
|---|---|---|---|
| 3,969,767 | 7/1976 | Griffiths | 360/99 |
| 3,994,017 | 11/1976 | Barkhuff | 360/133 |
| 4,167,029 | 9/1979 | Ragle | 360/133 |

OTHER PUBLICATIONS

King–"Self-Ventilating Flexible Disk..." IBM T.D.B. vol. 17, No. 6, pp. 1712-1713, Nov. 1974.
Kleczkowski–"Disk Selection in a Stack of Stabilized Flexible Disks" IBM T.D.B. vol. 20, No. 3, pp. 914-915, Aug. 1977.
Seifert–"Disk Stabilization in Self-Ventilated Disk Packs" IBM T.D.B. vol. 19, No. 11, p. 4229, Apr. 1977.
Barbeau–"Disk Pack Stabilization" IBM T.D.B. vol. 17, No. 11, p. 3353, Apr. 1975.
Barbeau–"Bistable Flexible Disk Pack" IBM T.D.B. vol. 18, No. 9, pp. 2962-2963, Feb. 1976.
Griffiths–"Record Disk Assemblies" IBM T.D.B. vol. 16, No. 12, p. 3838, May 1974.

Primary Examiner—Robert M. Kilgore
Attorney, Agent, or Firm—John J. McCormack; Nathan Cass; Kevin R. Peterson

[57] ABSTRACT

Improved flexible disk pack magnetic storage systems and associated elements are illustrated as adapted for end-wise pneumatic partitioning of a pack of flexible record disks and indicate, among other features, the use of "isolation packs" flanking the record pack to better isolate it, and especially the outer record-disks, from an outer pair of end-plates between which the isolation packs are disposed, the size and composition of each isolation pack being optimized and the gaps between isolation disks preferably coupled, pneumatically, to prescribed record-gaps and varied in height, with "large" isolation gaps coupled to "record-gaps" that are more difficult to partition.

39 Claims, 19 Drawing Figures

FLOPPY PACK WITH VARIABLY-SPACED ISOLATION MEANS

CROSS REFERENCE TO RELATED APPLICATIONS

This application is a Continuation-in-Part of our commonly assigned, previously filed U.S. application Ser. No. 156,197, filed June 3, 1980, entitled "Improved Floppy Pack with Improved Spacer Means" by Dean DeMoss and Harvey J. Richardson hereby incorporated by this reference.

INTRODUCTION, BACKGROUND

This invention relates to flexible recording disk packs and particularly to improved techniques for developing a stacked array of flexible disks with enhanced isolation means at its ends.

Workers in the subject art have constructed record storage apparatus using coaxial stacks of flexible record disks, as indicated, for instance in U.S. Pat. Nos. 3,838,462; 3,838,461; 3,969,767 and 4,167,029.

Workers are aware that the use of floppy disk packs dictate minimal cost for pack elements and associated equipment, such as partitioning means. The invention is directed toward this end, and toward accommodating a simple, non-mechanical, pneumatic, end-wise partitioning of floppy disk packs, as well as toward providing improved disk packs which are better adapted to meet the foregoing problems and objectives. Such disk packs and associated end-wise partitioning means may be gleaned from the cited U.S. Pat. No. 4,167,029 for "Jet Distributor for End-Wise Pneumatic Partitioning of Disk Pack" filed by H. Ragle et al. and commonly assigned herewith, this being incorporated herein by reference.

For instance, in the typical prior version of such pneumatically partitioned floppy packs, no particular attention has been paid to "isolation means" serving to couple the ends of a floppy record-disk pack (record pack, RP) from respective end-plate means, while isolating it therefrom to prevent interference. This invention is directed toward such isolation means. The invention is particularly apt for such packs wherein means are also provided for directing separation air streams axially of the pack—e.g., to the record-gaps (between record disks—to open these for transducing) as well as to the "isolation-gaps" between isolation-disks.

Thus, in one preferred embodiment the invention will be seen to comprise an axially-partitioned pack of recording disks flanked by upper and lower "dummy" (isolation) packs, these in turn flanked by respective (upper, lower) end-plates. Partition holes are provided through all the disks, with annular "rim means" provided to surround these holes and afford better pneumatic isolation as well as providing a surface for disk support. Preferably, each "recording gap" (space between recording disks) has at least one of these rim means broken-away (at least partly, and preferably so as to divert air radially inward) so that the associated partition air jet will be circulated more widely as the pack rotates. Preferably, such rim means are also combined with an inner "hub-rim" to isolate the hub (spindle) area, to deflect and distribute gap air and to cooperate with rim means in creating a solid support surface for adjacent disks. Such a rim and rim means will be seen to direct and divert partitioning-air along the plane of the disks for good pneumatic partitioning.

Prior Art:

Workers in the art have, of course, considered various techniques for providing flexible disk packs. For instance, in cited U.S. Pat. No. 3,969,767 to Griffiths et al (and in references noted therein) attention is directed to semi-rigid washers, coaxially disposed to form an air-permeable spindle for coaxially supporting flexible record disks. Such washers have radially extending passageways and teach a rotating tubular spindle with means for supplying gas thereto to be distributed radially outward from the hub of such a pack through such air permeable washers. A rigid stabilizing plate at each axial end completes this assembly. The following IBM technical disclosure bulletins also show stacks of flexible disks with various means of partitioning suggested: IBM-TDB August '77, page 914; IBM-TDB of April 1977, page 4229 (showing "vent holes" for self-ventilation of the pack, except for provision of a relatively non-apertured central disk) and IBM-TDB of November 1974, pages 1710, 1711 (where a record pack is flanked by upper and lower dummy packs including disks separated by ventilation holes to be placed in registry along the stack). Neither this nor any other known prior art has any suggestion of any particular necessary composition or spacing of such "dummy" packs however—as taught herein.

The present invention is directed toward providing improved flexible disk packs—these being better adapted to meet the foregoing problems and objectives. The foregoing and other features, objects and advantages according to this invention will be more fully appreciated and will become more apparent upon consideration of the following description of the preferred embodiments taken in conjunction with the attached drawings, wherein like reference indicia denote like elements.

BRIEF DESCRIPTION OF THE DRAWINGS

FIGS. 3 and 4 show respective forms of a disk from such a pack, as modified with a "rimmed" inter-disk spacer formed from two half-spacers pressed "back-to-back"; while

DETAILS OF THE PREFERRED ENVIROMENT

Improved isolation means is taught, this being intended to afford better air-separation of the floppy disks in such packs according to the invention. First, a preferred environment apt for use of the invention, will be described, in connection with the showing in FIGS. 1–5.

Figure 1:
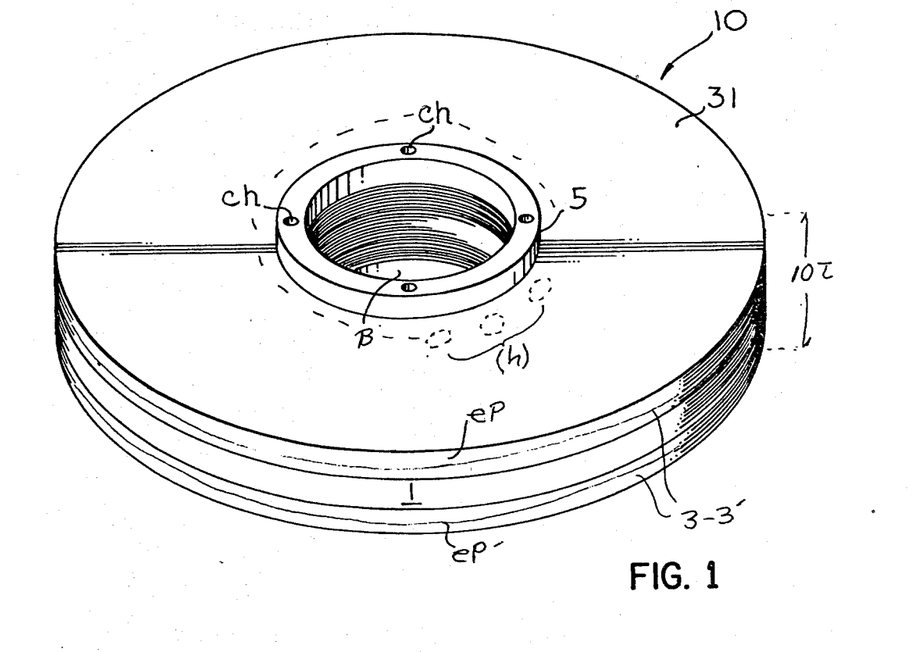
FIG. 1 is an upper perspective rather schematic showing of a flexible disk pack adapted for using the subject invention; with FIGS. 5A–5G showing portions of this pack in various aspects of partial schematic side section.

Overall Memory Module; FIGS. 1–5:

A composite flexible magnetic recording disk unit or memory module 10 is shown in FIGS. 1 and 5 and will be understood as adapted to impart improved axial partitioning characteristics. Further details of these and related environmental elements will be evident in our above-cited Application. Except as particularized herein, all elements, devices, components, etc., and all associated methods of making and using them will be understood as implemented according to good practice prevailing in the art today.

Unit 10 will be understood as comprised of three multi-floppy disk packs, with spacers between all floppy disks: i.e., a recording pack 1, flanked by a pair of upper/lower "dummy" packs 3, 3', plus associated outer end-plates eP, eP', or "stiffeners". Unit 10 is adapted to be conventionally engaged by a known rotation (like those used with other high performance floppy pack arrangements and involving disk rotation on the order of several thousand rpm or more). Disk rotation, transducer operation and associated control means will be understood as provided by conventional means (not shown here).

That is, recording pack 1 comprises a stack of like flexible recording disks (e.g., d-1, etc., preferably of a 1.5 mil polyethylene terephthalate stacked in registry for high speed rotation, being separated uniformly by cylindrical washers, or "spacers". Here, "separation air" and "partition-air" is to be drawn axially, via partition holes h, through the disks and the spacers as more completely detailed in U.S. Ser. No. 155,366, filed June 2, 1980 for "End-Wise Partitionable Disk Pack" by Dean DeMoss and Herbert U. Ragle (hereby incorporated herein by this reference).

Each "dummy" pack 3, 3' is further detailed below and may generally be understood as comprising an outer stiffener (cf. end-plates eP, eP' mentioned below) and an array of adjacent spaced supporting flexible disks, or ("dummy" disks dB-A, etc.), these being separated by spacers (sufficient to accommodate a prescribed maximum deflection of record disks d). This will also accommodate a prescribed maximum deflection upon head entry—without detracting from the normal flexible disk/head engagement familiar to those in the art of floppy disk recording with stacks of floppy disks. The planar end-plates (or stabilizer plates) may be a conventional rigid plate, but preferably comprise a stack (e.g., 30) of contiguous un-spaced floppy disks like the disks in packs 1, 3, 3'—each end-plate to be centrifugally "spun-flat" once the array 10 reaches nominal rpm (as detailed in U.S. Ser. No. 155,366 cited elsewhere). The end-plates are apertured with partition holes and fastener-holes adapted to register with those through the disks and spacers (congruent patterns) as indicated functionally in FIG. 5A.

Dummy packs 3 and 3' are provided to offer a smooth transition between the adjacent rotationally-stiffened end-plate and the deflecting motions of the recording disks in pack 1, during partition deflection. Thus, each dummy stack serves to separate the closest recording disk d from an (otherwise-adjacent) end-plate by a prescribed distance which allows maximum partition-deflection thereof, while still isolating it somewhat from "high pneumatic impedance" zones adjacent that end-plate.

The record and flanking "dummy" packs are all held together in one integral disk unit, (module 10) by rigid relatively conventional retaining plates, such as collars 5, 5' illustrated and their associated fasteners (e.g., connecting rods, not shown). Details may be seen in our cited companion Application.

The central bore B (see $H_c$ in FIG. 3), or hub channel, may be any convenient size to accommodate rotation coupling means. Unlike conventional hub-holes, however, it will not be required to admit "partition air" or "separation air" (to be passed through the spacers radially into the gaps between floppy disks). This is because such air can, instead, be introduced via partition holes h as noted below.

Record Pack 1:

In its preferred form, the record pack 1 will be understood as preferably comprising a stack of like flexible recording disks stacked in registry and uniformly separated by like spacers, with the supporting "dummy-disks" being provided to accommodate the expected partition deflections and resilient engagement of such recording disks with an associated transducer. (A typical known rigid "floppy disk transducer" such as transducer TR, FIG. 2, being preferred, as known in the art). Pack 1 is here preferably comprised of about 20 floppy disks (1.5 mil each), stacked to be each uniformly separated by a rigid spacer/washer (e.g., made of metal, plastic or the like—disks and spacers being perforated with the mentioned holes h, ch).

Figure 2:
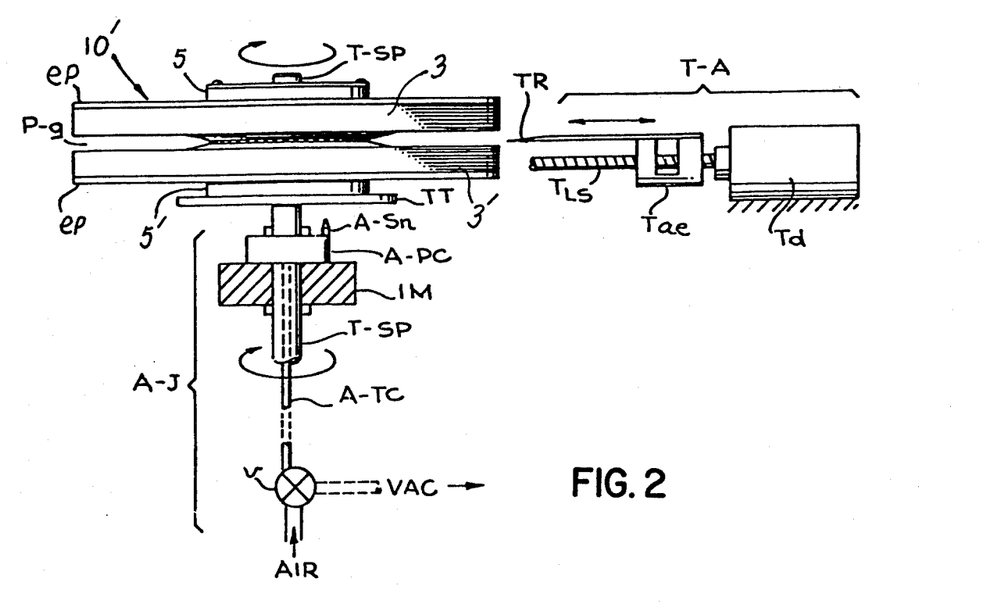
FIG. 2 is a rather schematic elevation showing a simplified exemplary arrangement for end-wise pneumatic partitioning of such a disk pack, along with means for rotating the pack and means for selectively injecting a transducer assembly into the pack.

Pneumatic, axial partitioning; FIG. 2:

FIG. 2 schematically suggests how a floppy pack embodiment like that of FIGS. 1 and 3–5 may be partitioned axially, or "end-wise", and pneumatically (for more details please refer to U.S. Ser. No. 155,366 cited above).

Thus, FIG. 2 is a schematic, rather generalized functional showing of a flexible disk unit 10' mounted on a conventional spindle T-SP and turntable TT (for relatively high speed rotation; unit 10 being understood as generally the same as unit 10 described above, being retained between a pair of collars 5, 5'). A pneumatic partition assembly AJ will be understood as adapted to pneumatically partition the record pack 1 (between dummy packs 3, 3' as in FIG. 1) for access entry of a conventional transducer array TR, adapted for high speed transduction as generally understood in the art. Here, and elsewhere, the materials, mechanisms and systems alluded-to should be understood as conventionally constructed and operated as presently known in the art, except where otherwise mentioned.

For illustration purposes, a conventional transducer array TA is very functionally indicated and understood as adapted for selective translation (as indicated by arrow) into, and out of, partition gap P-g between recording disks in pack 1 so as to present the transducer array TR in transducing relation with a prescribed disk surface. The partitioning air supplied by partition jet assembly AJ is adapted to present a high speed jet of partitioning air end-wise of unit 10', to be entrained up a prescribed one of the bores generated by the array of registered partitioning-apertures h in the spacers and disks. This selection may be controlled according to the rotational position, or indexing, of a delivery jet nozzle A SN relative to unit 10'.

Figures 3, 4:
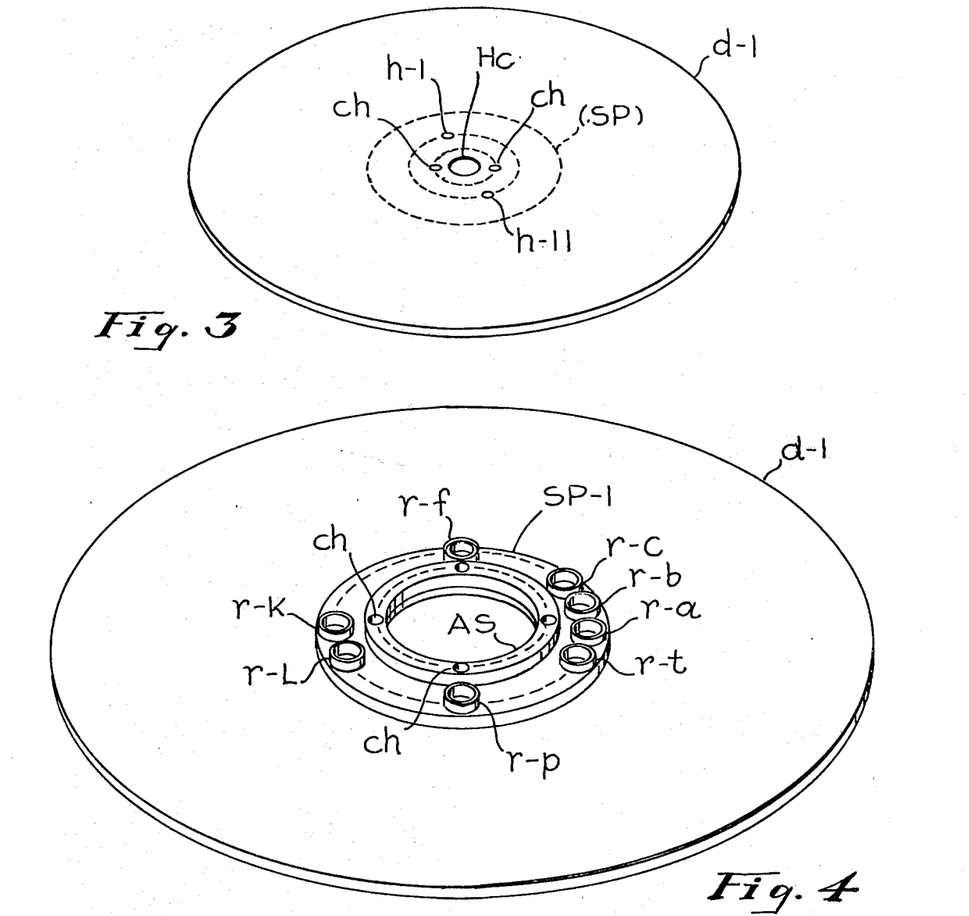

"Rimmed" partition-holes; FIGS. 3, 4 and 5:

FIGS. 3–5 indicate how the circumferential array of partition holes h are disposed in registry through the disks and intermediate spacers (so stacked) to form an array of "partition bores" extending axially of unit 10. More particularly, they indicate how air conduit means, or "rims", may be used to supply effective air conduction along such bores, between disks; while also providing an annular "support-plane" (made up of a circumferential array of rims, e.g., the top surfaces of rings r-a through r-t in FIG. 4).

In a related feature, one can see that certain of these "rims" are "partial", i.e., broken-away so as to extend less than 360° about their hole h and so as to divert their jet stream into the inter-disk gap they bridge. Details of such "rim means" and their operation (and of various alternative forms thereof—e.g., as in FIGS. 4 and 4A, 4B, 4C) may be found in our companion application cited above.

All spacers and all disks will have 20 partition holes h and be stacked so these holes (and the coupling holes) register in a particular pattern. Those holes will be rimmed, or semi-rimmed, on at least one side of each spacer (preferably on both sides). The semi-rim may encompass roughly 180° on the radially-outer side of a spacer's partition hole, or encompass more or less degrees depending upon the desired jet deflection and diversion. In some instances the spacers may be eliminated, with the floppy disks themselves being "rimmed".

FIG. 4 shows a record disk d-1 with such a rimmed spacer SP-1 superposed thereon, the spacer being penetrated by a circumferential array of coupling holes ch—these to be stacked in registry with an identical array of like holes ch on disk d-1 and all the other disks and spacers. Also, a circumferential array of aperture holes h is provided in SP-1, these presumed as stacked in registry with hole array h-1 through h-20 in all disks and spacers (e.g., see FIG. 3). According to the aforementioned "rim" feature, each of these partition holes h is surrounded by a rim means r, there being 19 full identical cylindrical rims r-a and r-c through r-t, with one "partial rim" r-b (or semi-rim) at hole $h_s$. "Semi-rim" r-b is adapted to admit the jet stream for partitioning at its gap, directing it radially inward for centrifugal distribution.

Spacer SP-1 will further be seen as including a "hub-rim" or annulus AS of a width sufficient to span the diameter of coupling holes ch, of the same height as rims r (which are all the same height) and completely circling the hub edge (or radially-innermost portion) of the spacer. Thus, when all the disks and intermediate spacers of unit 10 are compressed between collars 5, 5', the upper surfaces of rim AS and rim array r-a through r-t will be co-planar and form a reference surface and support platform for the floppy disk dB-A pressed thereon.

Figure 8:
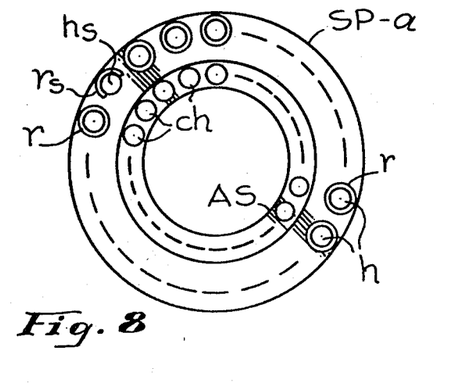
Figure 9:
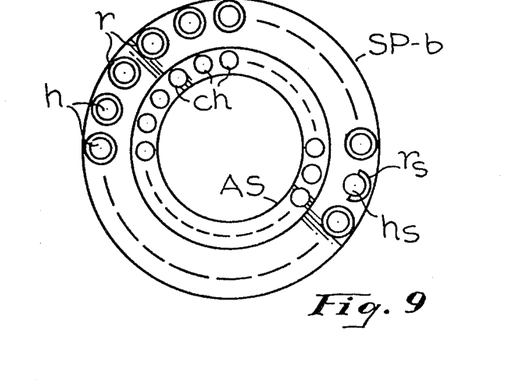

Spacer SP-1 are preferably formed of identical back-to-back, half-spacers; e.g., as with half-spacers sp-a, sp-b in FIGS. 8 and 9 (described in my companion Application).

Hub-rim AS provides a registration surface against which the adjacent floppy disk surface may be pressed and positioned—as well as preventing the exit or entry of air from the hub region and deflecting and diffusing an incident jet stream. Rim AS also keeps the disks relatively flat, especially as used in conjunction with the "co-planar surface" formed by the circumferential array of partition-rims r—all these being of the same height.

Figure 4A:
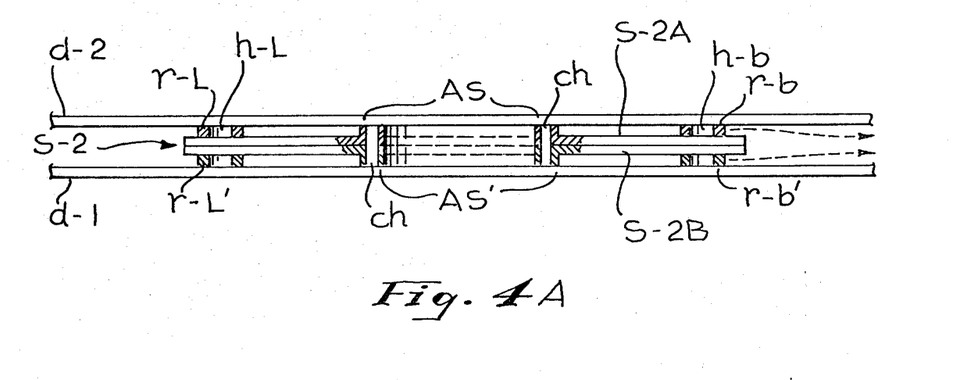
FIG. 4A shows a schematic sectional view of such a spacer in place between floppy disks.

It was observed that spacers like those of FIG. 4A induced an undesirable "clumping" of disks—whereby some disks appeared to merge toward one another, and so attenuate their respective gap-heights (or disk-separation at least adjacent their outer periphery), while others would diverge and so open-up their separation distances, and still others would not appear to be affected, maintaining the prescribed separation. Surprisingly, this phenomenon was also repeatable—not random—i.e., every gap would react the same way for a given set-up no matter how many times the pack rotation was interrupted. Also, this clumping should be distinguished from a "wobble" or "flutter" of a disks periphery—such is not of concern here.

Figure 5A:
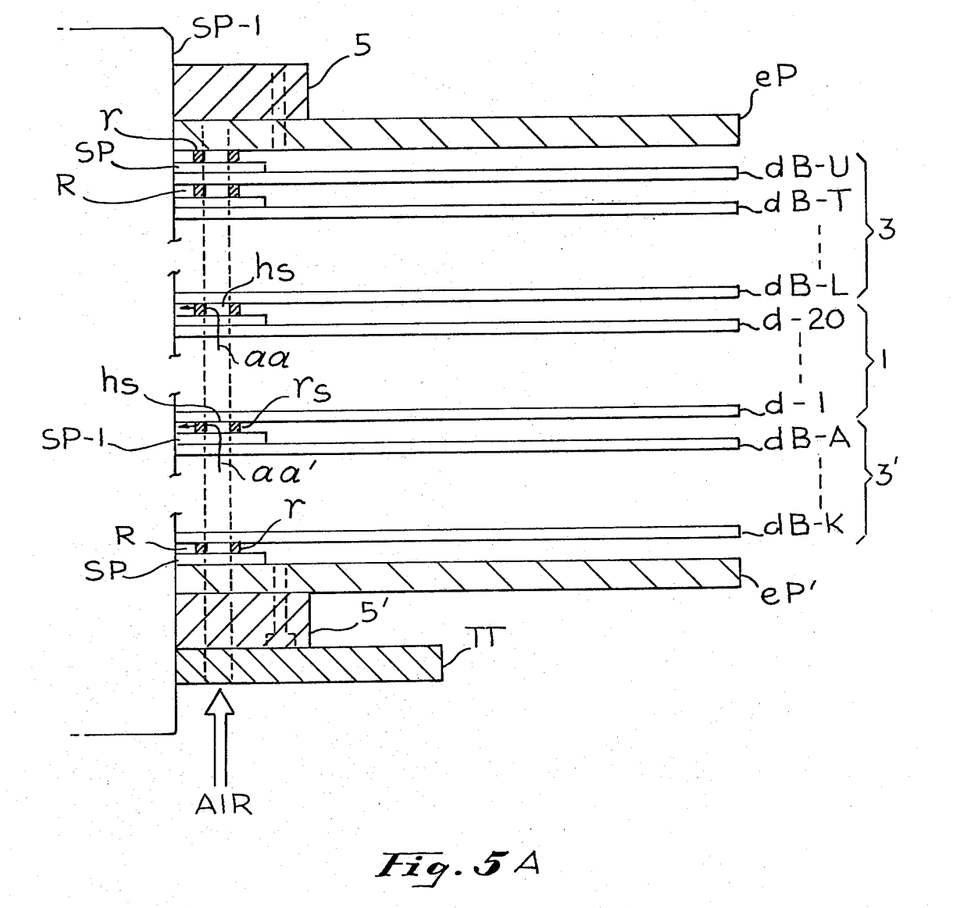

Thus, when a partitioning jet stream is selectively directed up the "h-b" partition bore through unit 10 (cf. FIG. 5) it passes spacer SP-1 between disks d-1 and dB-A and will emerge into the gap therebetween, being deflected and diverted by semi-rim r-b—proceeding radially inward and, striking hub-rim AS, to be redirected over a wide sectorial angle. Centrifugal forces experienced by the spinning pack will throw this stream radially out for better, more effective partitioning over a wider sectorial angle (as opposed to using other simpler spacer means, such as "slotted spacers"—see our cited companion application U.S. Ser. No. 156,197, where the mere outward slotting of a partition hole is adapted to throw the jet stream outward in a narrower sectorial angle and thus partition the gap more narrowly).

Of course, workers will understand that such an array of partition holes and associated rim means may be modified so that several partition holes and associated semi-rims, rather than one, may be employed for each partition gap.

Figure 6:
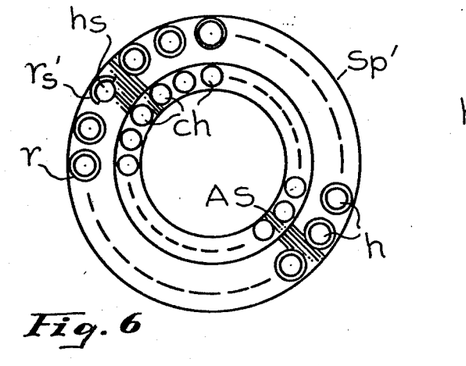
FIGS. 6 through 9 show the same, or similar, type spacers in plan view.
Figure 7:
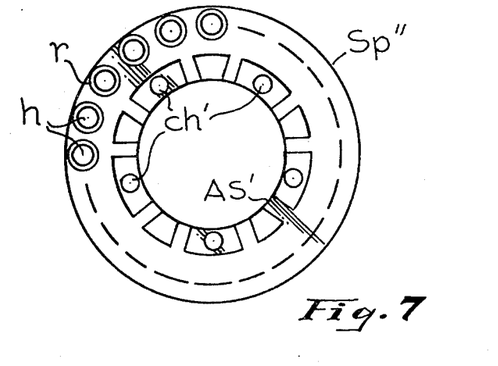

"Rimmed" spacer SP' in FIG. 6 will be understood as functionally the same as spacers sp-a, sp-b (FIGS. 8,9) except that its "select hole" $h_s$ is not "enlarged". And spacer SP" of FIG. 7 may be taken as representative of a spacer having no "select holes", and thus no "semi-rim" $r_s$—such a spacer may be useful in certain cases (e.g., with a dummy pack), although it is "non-preferred". Spacer SP" also illustrates a modified, "segmented" (or fenestrated) version of a hub-rim—i.e., a rim AS" which is not continuous and integral about the hub, but is breached, or segmented, in a regular symmetric pattern to admit radial passage of "separation air", e.g., air drawn-in to proceed radially-out from the hub region and expand the inter-disk gap.

Now, at first, it appeared that isolation or separation air could be introduced through the spindle hole and, passing through the openings in fenestrated rim AS' could adequately partition its respective gap. However, it was later observed that this mode tends to introduce insufficient air, "starving" the gap (e.g., between dummy disks) and inducing the flanking disks to collapse upon one another.

According, it is preferable to introduce separation air (e.g., even for the dummy-gaps) through the partition holes h—assuming sufficient holes are available for this. For instance, one or two particular partition holes may be set aside for use in common by all dummy disks; alternatively, each dummy-gap can be "slaved" to a respective recording gap and so caused to share the air therewith, according to this invention, as detailed elsewhere.

Invention Context; FIGS. 5A–5E

With the foregoing in mind, a preferred context for the invention may be gleaned from the following description with reference to FIGS. 5A–5E.

Thus, in FIG. 5A is shown a floppy recording pack 1, flanked by two dummy packs or isolation means 3, 3'; with these in turn flanked by respective end-plate means eP, eP'—these preferably taking the forms described above (pack 1 comprising disks d-1 to d-20, separated by like spacers SP in inter-disk gaps g—dummy pack 3 comprising similarly spaced dummy disks dB-L through dB-U and pack 3' comprising similarly spaced dummy disks dB-A through dB-K).

We have found that it is important to not only use sufficient dummy disks and intervening spacers to isolate a respective end-plate from the recording pack (as described above), but also so the interaction between end-plate and the recording pack may be optimized, while minimizing the mass of the intervening dummy pack. This is preferred by focusing on the "outer-gaps", that is the gaps just beyond the end of the outermost recording disks and separating them from the closest adjacent dummy disk (e.g., in FIG. 5A note "outer-gap" g-o between the bottommost recording disk d-1 and adjacent dummy disk dB-A and a companion outer-gap g-o' between the uppermost recording disk d-20 and the adjacent dummy disk dB-L). More particularly, it has been discovered that if the dummy pack is insufficiently thick (that is, has an insufficient number of dummy disks and intervening spacers and/or if it is "air-starved", such an "outer gap" would tend to be non-uniform—at times "divergent" as indicated at displaced gap $g_d$ in FIGS. 5B and 5C (as opposed to normal, uniform gap $g_n$, between relatively flat, level disks d-20 and dB-L shown in phantom in FIG. 5C and in-full in FIG. 5D).

Figure 5B:
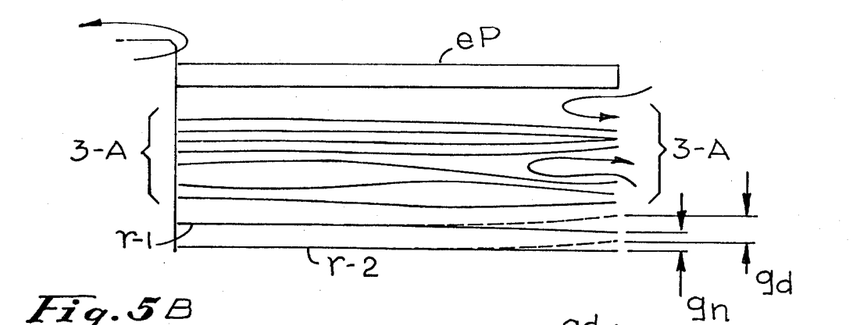
Figure 5C:
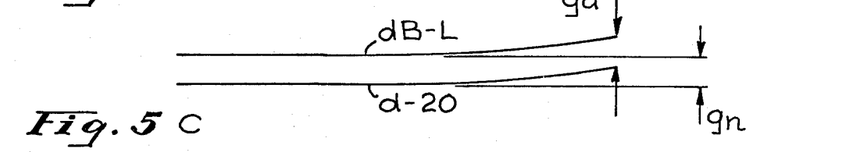

This is illustrated, for instance very schematically and functionally, in FIG. 5C where the gap is seen as expanding in height proceeding radially out to terminate at a maximum $g_d$ well beyond the norm of uniform gap-height $g_n$ and beyond its normal position. This displaces upper disk dB-A and its subjacent gap(s) undesirably. And, in a parallel reaction, the associated dummy-gaps (that is, gaps in this dummy pack) would tend to be relatively non-uniform, with the dummy disks tending to "clump" and separate as described above, as well as to "pull-in" the adjacent record disk d-1 (all three effects indicated in FIG. 5B). All this produces undesired discontinuities in the positioning and configuration of the record disks. This is believed due, in part, to a state of "under-pressure" between some or all of the dummy disks, whereby they tend to "clump together" and whereby ambient air tends to be drawn-in between clumps as indicated by the arrows in FIG. 5B. Such under-pressure may be said to render the dummy pack "inspiratory", with ambient air being sucked-in and adjacent record disks pulled toward the dummy pack.

And, as these "inspiratory" effects tend to pull dummy disks away from the record pack 1 (with one or several adjacent record disks following), it was observed that control over partitioning is badly degraded—at times lost! That is, the adjacent "outer" record disks (e.g., #1, #2 or #19, #20) tend to have their gap height reduced, while conversely the "inner" disks (e.g., #9, #10, #11, #12) have their gap height enlarged. This, in turn, makes it even easier (than normal) to pneumatically "split" the inner disks and even harder (—at times impossible) to split the outer ones, no matter what the partition pressure. In some cases, an attempt to split a certain gap results only in a different gap opening up.

It was discovered that this condition can be alleviated simply by increasing the size of the dummy pack and/or increasing the thru-put of separation-air flow through the dummy-gaps, uniformly, until this outer gap becomes relatively uniform and the other associated undesirable effects are also substantially alleviated thereby.

It has also been discovered that it becomes more difficult, in general, to pneumatically open a gap the closer one gets to the stiffener—e.g., referring to FIG. 5A at a given air flow, etc. one finds it harder (e.g., more cfm needed) to split the gaps outside records d-9 or d-12 than those outside "central" records d-10, d-11; and it is considerably harder to split the gaps outside records d-1, d-20; and it is even harder to split the gaps in the isolation packs 3, 3'.

Thus, with the above in mind, one should provide dummy (isolation) packs as indicated of sufficient thickness and air-flow to accommodate maximum deflection of the nearest record disk as well as rendering it readily "splittable" with the available air flow, while also curtailing "inspiratory" effects to leave the record disks flat and stable.

Dummy Packs; size, air flow

Here, and elsewhere, it will be understood that satisfactory pneumatic partitioning ("splitting") of the record gaps will involve opening the selected gap when called for; keeping it open and stable sufficient to permit transduction in the so-opened gap; and thereafter closing the gap upon command. And workers will appreciate that the air flow through a record gap should not rise above a certain nominal value of pressure/flow (peculiar to each array) lest undesired turbulence result detracting from the desired "laminar" flow and stable unfluttering disks. Thus, a prime consideration will be to provide for such pneumatic partitioning at the minimum air flow (cfm).

Assume that stiffener eP in FIG. 5B is constructed and operated to normally lie relatively flat during pack-spin, at least along the side facing the dummy pack 3. Also assume that record pack 1 is likewise arranged and operated so that its inter-disk gaps will be relatively uniform. If one starts with a relatively few dummy disks dB (e.g., about 4 for a 20-disk record pack 1 of the type described above), we find that the outer gap g-o' (FIG. 5A) will typically be "divergent" as indicated very functionally in FIG. 5C (gap g-o similar)—also assuming that the module 10 is otherwise generally as aforedescribed, for instance, with each disk d, dB being the same and about 1.5 mils thick and with all spacers being about the same thickness such as about 12 mils each.

Now if the size of dummy pack 3 is simply increased (more dummy disks and intervening spacers) to comprise about 10 dummies with intervening spacers, we find that this outer-gap becomes less divergent. If one also sufficiently pressurizes the dummy gaps (e.g., by slaving to record gaps as seen below) the record gaps lose all divergence and become uniform (as functionally indicated in FIG. 5D) and other related problems seem to be alleviated too. More particularly, the clumping and other discontinuities of dummy gaps are substantially alleviated and the adjacent record disks are not pulled-in ("inspiratory" effects abated).

More than about 10 dummy disks and intervening spacers doesn't seem to improve things much, here, and has the undesirable effect, of course, of adding unnecessary mass to the dummy pack—assuming that 10 such dummy disks gave the proper isolation, etc., between the recording pack 1 and the adjacent end-plate eP.

Workers in the art, have, of course, noted that in certain cases a pack of flexible recording disks may be advantageously flanked by dummy disks of one kind or another (e.g., see IBM-TDB, Vol. 17, No. 6, 1974, pages 1710, 1711). However, nothing in particular has been specified regarding the size or composition of such a dummy pack—for instance, no relation between the size of such a pack and "clumping" effects like the aforementioned, nor any mention of the desirability of such dummy packs flanking a recording pack in relatively identical pairs, while we find this is preferable with arrangements like the above).

Figures 5D, 5E:
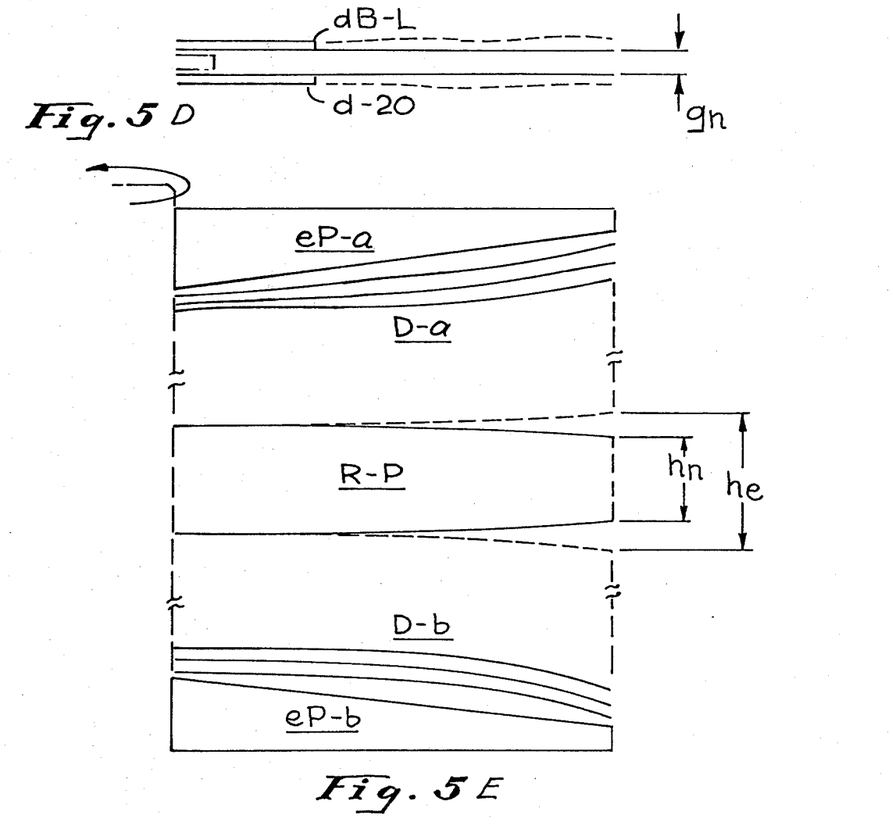

Workers, while noticing such "clumping" effects as well as the tendancy of the dummy disks to dilate the record pack, have resorted to other, more cumbersome expedients, such as the rigid wedge-shaped spacer plates eP-a, eP-b in FIG. 5E introduced to (at least partially) compensate for "gap divergence" of dummy packs.

According to a feature, related to this optimization of the size and composition of flanking dummy packs, we have discovered that it can be advantageous to "pressurize" (increase radial-outward air flow) dummy-gaps by "slaving" each to a respective record disk gap. That is, when the "dummy-gaps" (between disks in dummy- or isolation-pack) begin to close under such "clumping" and exhibit other "inspiratory" effects, some record-gaps will be observed to shift and expand at their outer edge (e.g., as adjacent dummy disks pull away). This can cause a loss of control over partitioning, as workers will imagine. Conversely, when the dummy-gaps are sufficiently pressurized, such inspiratory effects are abated (e.g., and record gaps become more uniform).

Figure 5F:
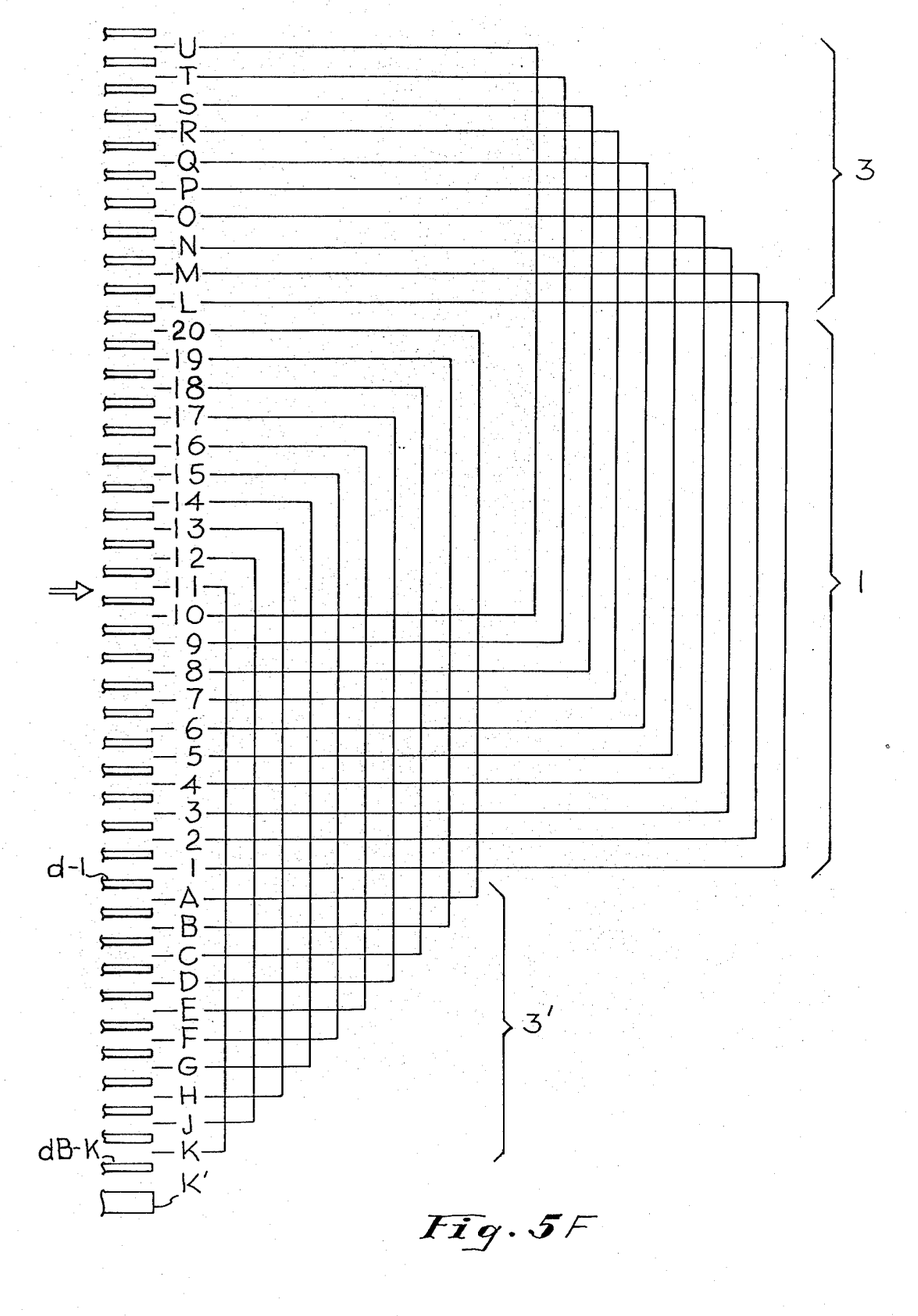

One simple, convenient preferred way of so pressuring the dummy gaps—according to a feature hereof—is to "slave" each to a respective record gap so their pneumatic thru-put is "shared". An example of this is schematically indicated in FIG. 5F. FIG. 5F, very schematically depicts all gaps in FIG. 5A; i.e., record-gaps 1–20, above record disks d-1 to d-20, respectively, plus dummy-gaps L-U and K through A, above like-identified dummy disks dB-L to dB-U and dB-K to dB-A—only the tips of the disks being shown, with spacers, etc., deleted for simplicity. Thus, gap 20 (above record disk d-20 in FIG. 5A) is coupled pneumatically to share air flow with (dummy-) gap A (above dummy disk dB-A); and similarly for the other 19 record-gaps.

Figure 5G:
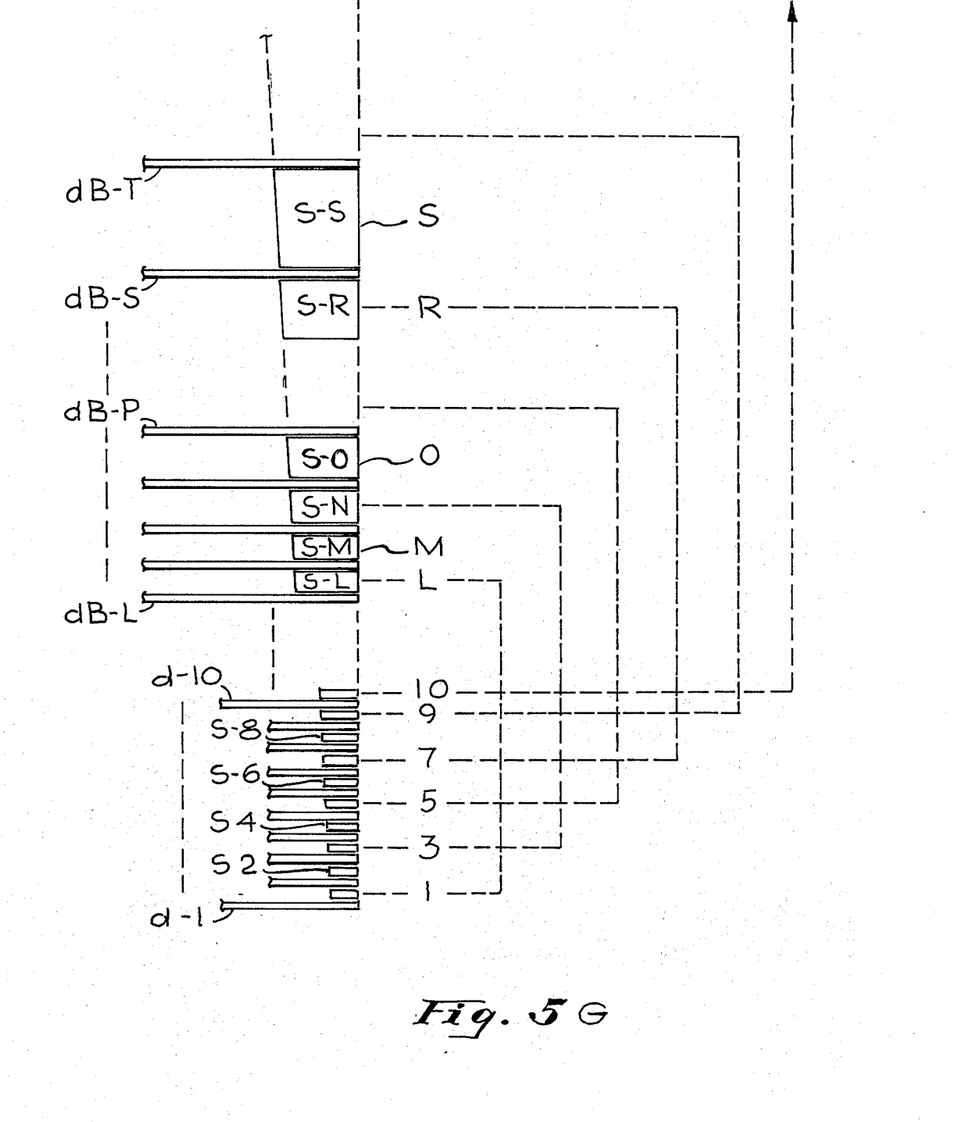

Varying dummy gap heights; FIGS. 5F, 5G

According to a further, optimizing feature, it is preferable to so slave record-gaps to dummy-gaps as remote as possible, thus minimizing possible inter-gap interference (e.g., "flutter" at one dummy gap being coupled to its companion record-gap during split-pressurizing). Thus gap #1 is slaved to #L, #10 to #U, #11 to #K and #20 to #A, and others accordingly.

It is also preferable to vary the height of dummy spacers according to which record-gap they are slaved to—with "inner" record gaps like #10, #11 each slaved to a dummy-gap having a relatively large spacer height and "outer" record gaps slaved to those with a relatively small height, with intermediate dummy-gaps "graduated" therebetween—e.g., as shown below in Table I. This is because it is found that such "outer" record gaps are considerably more difficult to partition than "inner" record-gaps.

That is, we discovered that resistance to partitioning forces in recording-gaps 1–20 is non-uniform, with the "centermost" gaps (e.g., #9, #10 and #11 of FIG. 5F) being the easiest and the "outermost" gaps (e.g., gaps #1 and #20) being considerably more difficult to "split". For instance, in a module like unit 10 described above, it might require on the order of 9 to 10 psi to "split" such "outer" gaps satisfactorily, but only 5–7 psi for the "central" gaps. This would appear to indicate that partition-air thru-put is relatively higher in the center of the recording pack 1 then it is at the extremities.

Similarly, we have also discovered that the "outer" dummy-gaps are harder to "split", i.e., as one gets closer to the stiffener it takes more air flow to open a gap.

Based on the foregoing, we tried "slaving" an "easy" record gap to a "hard" dummy gap (e.g., #11 to #U) and a "hard" record gap to an "easy" dummy gap (e.g., #1 to #L) and intermediate gaps similarly. But we were not too pleased with the results. Then, we reversed this pattern and slaved in an "easy-easy/hard-hard" mode, e.g., coupling #1 to #U; #11 to #L, etc. To our surprise this was an improvement. It was theorized that this is because a "hard" dummy gap is likely to "drain-off" less air than an "easy" one, leaving more for the companion record-gap. Thus, gap #U will probably drain less air from gap #1 then will gap #L. Conversely, an "easy" record-gap can better afford being coupled to an "easy" dummy gap with its increased drain.

In a related improvement feature, it was found preferable to "cross-couple" gaps so as to separate them as much as possible lest any disturbance in the coupled dummy gap offset the record-gap (e.g., a transient air-puff in a dummy gap might riffle adjacent disks). Thus, it is preferable to better equalize the "partitionability" of record gaps by "cross-coupling" them to a remote dummy gap in an "Easy-to-Easy/Hard-to-Hard" pattern—e.g., "Easy-Easy": #11 to #A, #10 to #L; "Hard-Hard"; #1 to #U, #20 to #K, etc.

However, we prefer to address this problem and allow all the record-gaps to be "split" at about the same, relatively moderate air pressure, by a "variable dummy gap" technique; one which arranges the air-supply system so as to "favor" these "outer" record-gaps. We can do this by providing a smaller (cross-sectionally) conduit channel for a dummy gap slaved to a "Hard" record gap. For instance, where a plentitude of thru-disk "bores" (as mentioned above) is available for all gaps (dummy- and record-gaps), certain "high thru-put" (high cfm) bores may be dedicated to these "inner" record-gaps while smaller (low cfm) bores are coupled to the "outer" record-gaps (e.g., by differential valving of air supply, etc.).

However, different implementation is required where only a limited number of such bores is available, as in the case of memory module 10 addressed above (FIG. 5F), where the bores and associated conduits must be "shared" between record-gaps and dummy-gaps. In such cases of "shared" ("slaved") conduits, it is proposed, as a preferred way of "favoring" the "outer" record-gaps to provide a novel "varying dummy gap"

arrangement, using dummy spacers of variable thickness. Such is indicated below in Table I, where the total air thru-put to each pair of (dummy-, record-) gaps is the same, but is differently apportioned—with more air flow to "outer" record gaps [and less to their companion dummy gaps by making the height of this dummy gap spacer relatively small], with relatively less air to "inner" record-gaps, the spacers of their companion dummy gaps being relatively large and thus drawing-off a relatively larger percentage of the common air supply. This can be called a system for "proportionately distributing" separation air.

This "variable dummy gap" slaving pattern (Table I) may also be characterized as a "HARD-small EASY-large" mode of slaving record-gaps to dummy gaps—since it will be observed that the "harder" a record-gap is to "split" (partition), the smaller will be the height of its co-operating dummy gap (spacer). Thus, the "hardest" record gaps, like #1, #20, are coupled to the smallest dummy gaps (L, A)—with the dummy-gaps getting larger as the splitting of their companion record-gap becomes "easier".

As above mentioned, it is also preferred to "cross-couple" the gaps so they are separated as much as possible—this resulting in a "cross-coupled" HARD-small/-EASY-large pattern as indicated in FIGS. 5F and 5G.

FIG. 5F indicates this "variable dummy gap" slaving pattern very schematically, with gap-connecting lines drawn (e.g., between record-gap #1 and dummy-gap "L", etc.) to denote which gaps "share", i.e., where each is slaved, being coupled in common to a given pneumatic conduit, such as to a particular "bore" (formed through disks and spacers by registering holes therein).

This slaving pattern is best appreciated by conceptually "halving" pack 1 into an "upper-pack" 1-U (disks d-11 through d-20) and a "lower-pack" 1-L (d-1 through d-10).

The "upper" gaps #11–20 are coupled to respective dummy gaps in the "more remote" dummy pack 3', with uppermost record gap, #20, coupled to uppermost dummy gap "A"; gap #19 to gap "B", etc., through gap #11 to gap "K". Similarly, "lower" gaps #1–10 are coupled to dummy gaps "L-U", respectively [thus a "cross-coupling-in-order", between the gaps of each half-pack—"upper" record to "lower" dummy, and "lower" record to "upper" dummy, with the same vertical ordering kept between coupled arrays].

Thus, in essence, the outermost, relatively air starved, record-gaps are coupled to the innermost, relatively air-flush, gaps of a ("remote") non-adjacent dummy pack. It was found—quite surprisingly—that so "slaving" record-gaps to dummy-gaps results in an unexpected improvement in the uniformity of the dummy gaps (across the entire dummy pack, as well as compared to one another) with significant alleviation of the aforementioned "clumping" and related "inspiratory" effects and problems.

The exemplary memory module 10 assumed for FIG. 5F and Table I will be understood to be the same as aforedescribed (except for the varying dummy-gaps); e.g., to include about 20 record disks (1.5 mil stock) each separated by a 12 mil spacer, with each dummy pack comprising about half this number of like disks and spacers.

It may also be assumed that separation air is supplied by source means (e.g., a single pump, etc.) that is, preferably, "time-shared" between a "quiescent mode", when all gaps (dummy and record) are supplied with normal separation air, and a "select mode", when only the "selected" record-gap receives air. Conventional, known valving means, (not shown) can implement this.

Figure 4B:
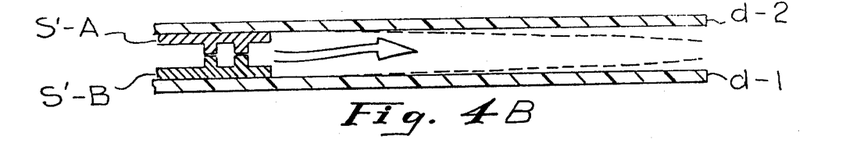
FIG. 4B is a like view of two such half-spacers pressed face-to-face and FIG. 4C is a like view of an array of like "rimmed" spacers, each formed from one integral piece.
Figure 4C:
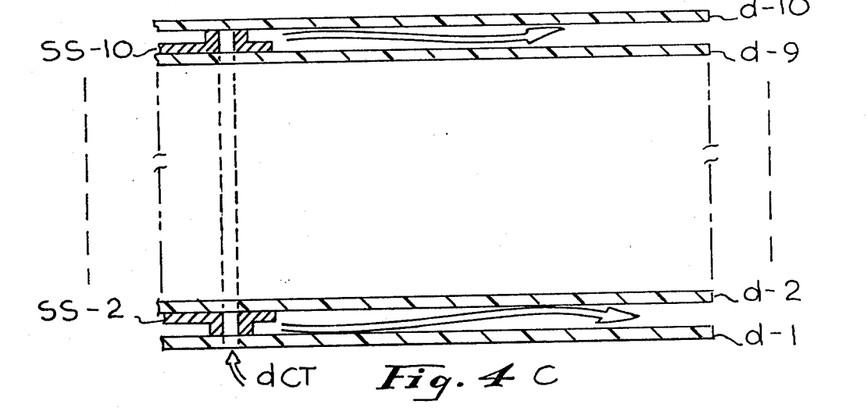

It may further be assumed that all mentioned spacers are preferably fashioned to be "rimmed" as the fashion of bi-part spacers S' -A/S' -B of FIG. 4B above (e.g., thus presenting an orifice, for the airstream, which has a height $h_o$ about half of the associated gap—i.e., $h_o = \frac{1}{2}$ the total spacer-height—yielding an orifice which is "centered" in the gap).

Thus, Table I will be understood as indicating such an array of graduated, variable-height spacers creating "varying dummy gaps" A-K and L-U (otherwise as with FIG. 5F, all other characteristics kept the same as above described, including record gap spacers, which are all 12 mils high). Since pairs of dummy-gaps may be similarly characterized, they are grouped together for convenience (e.g., gaps "L" and "A").

FIG. 5G, modeled after FIG. 5F, shows a portion of the disks, spacers and (schematic indications of) inter-gap coupling in FIG. 5F as modified per Table I. Thus, the "lower" half 21-U of record pack 1 is shown (disks d-1 through d-10, these 12 mils apart). Likewise, related ("slaved") dummy pack 3 is shown in part, with dummy disks dB-L, etc., and intermediate dummy-gaps "L" to "S" (T-U not seen), with associated intermediate dummy spacers S-L, S-M, etc., being drawn to roughly suggest the variable spacer heights indicated in Table I. The slave-coupling is also indicated exemplarily in dotted-line fashion (e.g., record-gap #1 slaved to dummy-gap "L", etc.).

TABLE I

| Dummy Gap | Spacer Height*($h_s$) (Total in Mils) | Effect Total Orifice Height (Mils) | Slaved to ? (Record Gap) | [Having ? Ease of Partitioning] |
|---|---|---|---|---|
| L-A | 8 (2 × 4) | 4 | #1–#20 | V. Hard (#1,#20) |
| M-B | 8 | 4 | #2–#19 | V. Hard |
| N-C | 8 | 4 | #3–#18 | Hard |
| O-D | 12 (2 × 6) | 6 | #4–#17 | Moderate |
| P-E | 12 | 6 | #5–#16 | Moderate |
| Q-F | 16 (2 × 8) | 8 | #6–#15 | Moderate |
| R-G | 16 | 8 | #7–#14 | Somewhat Easy |
| S-H | 20 (2 × 10) | 10 | #8–#13 | Somewhat Easy |
| T-J | 20 | 10 | #9–#12 | Quite Easy |
| U-K | 20 | 10 | #10–#11 | Quite Easy (#10,#11) |
| V-K' | (20+) | | | |

*formed by 2 spacers back-to-back as in FIG. 4, orifice-height is ½ $h_s$; gap #1 assumed above d-1, etc.

With this preferred slaving pattern of "variable dummy gaps" invoked, workers will observe that the more problematic, somewhat air-starved, ("outer") record gaps will be coupled to the relatively "air flush" ("inner") dummy gaps (e.g., record gaps #1, #20 are more resistant to splitting, especially at lower pressures, such as below about 10 psi,—therefore these will be coupled to associated "inner" dummy gaps "L, A", etc., of the opposing dummy pack to accordingly apportion the air flow during both quiescent and select modes.

One striking result of such an array (Table I) is that a constant, uniform supply of separation air may be delivered to all conduits (bores) at a single uniform moderate pressure (e.g., about 7-8 psi here) and still alleviate all the aforementioned difficulties—i.e., not only alleviate the "inspiratory" effects, but also allow most "outer" record-gaps to be split about as easily as all other record gaps. Also, the resultant "split" pack has much better dynamic stability, with very little "disk wobble" or other perturbations, and the read/write head can more readily "follow" a subject "selected" disk. Workers will appreciate how very desirable this is, yet how difficult to achieve. [However, as noted below relative to FIG. 10, extreme gaps #1, #20 still resist splitting at normal cfm unless either certain "tapered", flexible end-plates are used or else each dummy pack is expanded by about 90 disks and inter-spacers].

As an optimizing feature, we find that, with such an arrangement, air flow (cfm) should not be increased much above that yielding 7-8 psi at the split record-gap lest it be "over-pressured" and undesirable disk instabilities result (e.g., "wobble" observed at 9-10 psi; probably because of resulting excess air turbulence in the split gap). One must also avoid greater air flow than the minimum needed because increased flow (cfm) can begin splitting the slaved dummy-gap along with the (selected) record-gap coupled thereto.

Some Variations

Certain reasonable variations in this "variable dummy gap" technique will be contemplated. Some are discussed below.

(1) Less than all dummy gaps involved?

In certain cases workers may wish to maintain a single uniform dummy-spacer height except for those "slaved" to a problematical record-gap like gaps #1, #20. In certain cases, this will be satisfactory, especially where the enlarged-spacer system (e.g., #1-#L and #20-#A) is provided with increased air flow.

(2) Vary range of "graduated spacer-heights"?

Workers will question whether, and to what extent, the height of dummy-spacers may be varied from that specified for a given arrangement (e.g., from the effective total orifice-height range of 4 to 10 mils for the arrangement postulated for Table I). Such is proposed in Table II-A and Table II-B, below.

TABLE II

| dummy-gap: | L,M,N | O,P | Q,R | S,T,U,V |
|---|---|---|---|---|
| A: gap-ht.(mils) | 6 | 10 | 14 | 18 |
| B: gap-ht.(mils) | 10 | 15 | 18 | 21 |

Results: Neither pattern, II-A, or II-B, was very satisfactory. It was found that, for this memory module (as specified for Table I), one cannot drop below 7-8 mils in spacer height (3.5-4 mils total orifice height) without "starving" the air flow. This is true even when the flow (pump) is increased or decreased also.

It was also found that this module begins to go unstable (e.g., disks "wobble", gap pressure dropped too much) when maximum spacer height exceeds about 20 mils.

(3) Vary "graduation-step"?

Even accepting the aforedescribed 8-20 mil approximate range in total dummy spacer height, one might question whether the increments specified in Table I could be varied (e.g., change the +4 mil "step" of Table I to +2 mils or +6 mils as in Table III-A, Table III-B respectively—see below). Table III will be instructive on this (assume companion dummy pack similar).

TABLE III

| | [single dummy pack, illustrative] | | | | | | | | | |
|---|---|---|---|---|---|---|---|---|---|---|
| dummy-spacer gap | L | M | N | O | P | Q | R | S | T | U | V |
| A: Total ht.(mils) | 8 | 8 | 10 | 12 | 14 | 16 | 18 | 18 | 20 | 20 | 20 |
| Per Table I | 8 | 8 | 8 | 12 | 12 | 16 | 16 | 20 | 20 | 20 | 20 |
| B: | | | 8 | 8 | 14 | 14 | 14 | 20 | 20 | 20 | 20 |
| C: | 12 | 12 | 12 | 12 | 12 | 12 | 20 | 20 | 20 | 20 | |

Results? Such changes lie within the realm of optimizing a particular system and may improve or degrade performance somewhat—usually not radically!

For instance, the pattern of III-C was less satisfactory then Table I, with gaps #1 and #20 not "splittable" at all (with 7-8 psi and other conditions of Table I). Again, if one modifies the pattern of Table I a bit (e.g., change gap N to 10 or 12 mils, change gap 0 to 8 or 10 mils) minor improvements can result.

"Bad" Examples

We find, surprisingly, that the mentioned results of such "variable dummy gap" pattern of slaving (Table I) cannot be achieved by instead merely increasing all dummy gaps (i.e., uniformly increasing the height of all dummy spacers).

That is, we have duplicated the conditions of FIG. 5F except that all dummy spacers were made a constant 4 mils in height (2×0.002"); yet the mentioned difficulties in splitting "outer" record gaps still existed (e.g., required excessive air pressure).

A similar lack of success resulted from making all dummy spacers 8 mils high (2×0.004"), all 12 mils high, all 14 mils high, and all 20 mils high.

As Table I, but increase/decrease size of all record-gaps

The arrangement of Table I was modified to vary the height of all record gaps. That is, so the height of the spacers between record disks was changed from 12 mils [all spacers still being identical, being double, 2×0.006 back-to-back, etc., as above described] first to 14 mils; then to about 7 mils. Neither variation was satisfactory.

Increasing height to 14 mils (orifice increased from 6 to 7 mils high) made it too difficult to achieve any split at 7-8 psi (probably because of excess cfm through the selected record-gap, probably resulting in loss of pressure and disk-supporting force and a flow which was more turbulent and less laminar).

And decreasing spacer height to about 7 mils (orifice height decreased from 6 to 3.5 mil) made the record pack "unstable" and impossible to split (probably of reduced flow, even though pressure should increase)—typically opening an undesired "natural" split which couldn't thereafter be closed at all.

Figure 10:
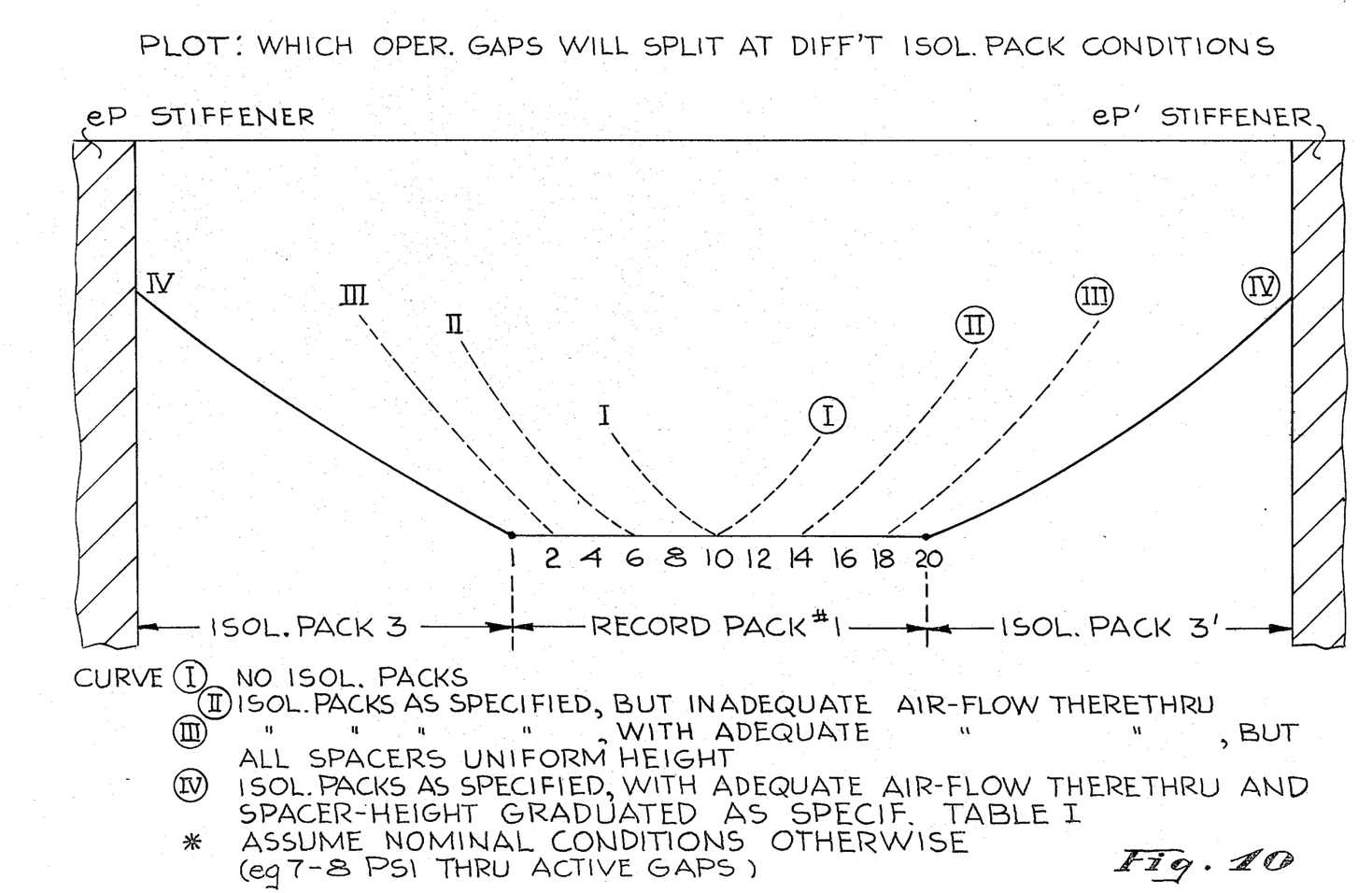
FIG. 10 diagrams various effects on partitioning.

Recapitulation (see FIG. 10)

FIG. 10 very schematically indicates how, for the module and conditions assumed for Table I, certain above-discussed characteristics of the isolation packs generally result in different pneumatic partition patterns in the record pack 1 (i.e., in gaps #1 through #20; "nominal" specified conditions prevailing, such as airflow sufficient to generate 7-8 psi in a selected record-gap, etc.). This sketch is only suggestive and should be interpreted as a very diagrammatic section through the pack between opposed stiffeners eP, eP', with curves I, II, III and IV spanning an illustrative, typical array of "partitionable" record gaps.

Thus, for the case where no isolation packs at all are used, curve I indicates that only a central (one or two) record-gaps are normally partitionable. Then, adding such isolation packs, without, however, providing for enhanced air-flow therethrough, opens up gaps #6-#14 approximately, as in curve II.

Then, providing such enhanced air flow, adds gaps #2-#6 and #14-#19 approximately as per curve III—unless a "variable height" array of dummy spacers is used (or equivalent as in FIG. 5G, Table I, etc.), in which case gaps #1 and #20 are also partitionable as per curve IV (so long as modified "tapered" end-plates are also used, or each dummy pack is expanded by about 90 disks and spacers!).

Conclusion

Thus, we advise providing suitable "dummy packs" flanking a flexible record pack (e.g., suitably high and suitably pressurized to avoid "inspiratory" effects and keep the record gaps uniform) while also "slaving" dummy-gaps to certain respective record-gaps. so as to increase the flow of partition air to the "outer" record gaps which are "harder" to split. This is preferably done by varying the air flow to different dummy-gaps: more to those "slaved" to an "outer" record-gap; relatively less to those slaved to an "inner" record-gap, [i.e., in this "variable-flow" array of dummy gaps, the "hardest" (to split) record gaps are each slaved to a dummy-gap having minimum flow (Min. cfm), while the "easiest" are each slaved to dummy gaps having Max. cfm].

Such "variable flow" may be implemented in various ways, such as the preferred array of "different-height" dummy spacers described above. However, workers will visualize other implementation—such as by varying the cross-sectional sizes of dummy air conduits or by varying the number of end-wise "bores" supplying the dummy gaps (e.g., 4 such bores for a dummy gap having Max. cfm; one bore to those having Min. cfm).

Or in certain cases the described array of "different height dummy spacers" may be modified (e.g., vs. FIG. 5G array, reversing the order or spacerheight graduation so the maximum height is in #L, then smaller progressively in #M, #N, etc., with the minimum height in #U; then slaving #1 to #U, #2 to #U, #3 to #T, #4 to #S, #5 to #R . . . etc., and #10 to #L—ignoring the disadvantages in having #10 closer to its slaved-gap #L, etc.).

Workers will perceive that such "gap-slaving" as aforetaught can, in general, be made to relieve deleterious symptoms of dummy-pack "instability" like the mentioned "clumping" of dummy disks (non-uniform dummy gaps, dummies gather in groups) and other "inspiratory" effects.

It will be appreciated that novel flexible disk modules and related techniques as here described may be used with the indicated, and with other related, recording systems and be advantageously employed in various ways. Such arrangements will be seen as especially advantageous in conjunction with disks, spacers and disk packs like those described.

It will also be understood that the preferred embodiments described herein are only exemplary and that they are susceptible of many modifications and variations in construction, arrangement and use, without departing from the spirit of the invention. For example, it should not be assumed that the pneumatic pressurizing of dummy-gaps must, in all cases, be effected by the indicated "slaving". Also, workers will contemplate alternate implementation, such as separately conducting increased air-flow to each dummy gap (if such means are feasible and/or if "slaving" is less preferable).

Further modifications of the invention are also possible. For example, the means and methods disclosed herein are also applicable with different related flexible disk means. Also the present invention is applicable for use with various other means for pneumatically partitioning a disk pack.

Various other non-illustrated variants will be contemplated within the scope hereof. For instance, the double spacers shown may be replaced with one equivalent spacer between disks. Workers will envision other like variants.

The above examples of possible variations of the present invention are merely illustrative. Accordingly the present invention is to be considered as including all possible modifications and variations coming within the scope of the invention as defined by the appended claims.

What is claimed is:

1. In an improved rotatable memory module comprising a stack of like-spaced flexible record disks stacked along a common axis to be co-rotated and adapted to be pneumatically partitioned, plus a pair of stiffener means, one at either end of the stack; and a pair of like isolation pack means, one between each respective stiffener means and the adjacent end of the record stack, each isolation pack means comprising a stack of spaced flexible isolation disks arranged along said axis in an isolation stack, the combination therewith of:

air supply means comprising conduit means adapted to conduct pressurized separation air to the gap between each adjacent pair of disks, this conduit means being arranged and adapted to also conduct a burst of partition-air to any "selected" one of the gaps between said record disks; this module further being arranged to deliver a relatively larger burst to those of said record gaps that lie at or adjacent the axial ends of said record disk stack.

2. The combination as recited in claim 1 wherein a prescribed isolation gap exists between each adjacent pair of isolation disks and a constant-length record-gap exists between each adjacent pair of record disks, with each record-gap coupled pneumatically to a respective isolation gap so as to share a common stream of separation air and so facilitate enhanced air supply to the isolation gaps.

3. The combination as recited in claim 2 wherein certain of said isolation-gaps are relatively larger than others, these being so coupled to certain "outer" record-gaps at, or adjacent, the axial end of the record stack.

4. The combination as recited in claim 3 wherein in each isolation pack, the spacer height is varied between a Minimum, for gaps slaved to "outer" record-gaps, and a Maximum for gaps slaved to "inner" record-gaps.

5. The combination as recited in claim 2 wherein the record stack is conceptualized as halved into two similar upper and lower stack-halfs; and wherein the "upper" half-stack has its uppermost record-gap coupled to the uppermost isolation-gap of the axially remote, "lower" isolation pack, and with each adjacent record-gap, proceeding downward, being coupled-in-order to a respective "lower" isolation-gap;

while, similarly, the "lower" half-stack has its uppermost record-gap so coupled to the uppermost isolation gap of the remote, "upper" isolation-stack, with each adjacent record-gap, proceeding downward, being so coupled to a respective lower isolation-gap in order.

6. The combination as recited in claim 2 wherein all disks include apertures therethrough for axial passage of separation air streams.

7. The combination as recited in claim 6 wherein all disks are identical and said isolation packs are identical.

8. The combination as recited in claim 7 wherein said stiffener means comprise a pair of like floppy end-plates, each made up of at least one stack of contiguous floppy disks adapted to present a relatively smooth, semi-rigid face toward the adjacent isolation-stack when the module is rotated at a prescribed minimum operating rpm.

9. The combination as recited in claim 1 wherein the gap between each pair of record disks is coupled to separation-air supply means in common with a respective isolation-gap between an associated pair of isolation disks.

10. The combination as recited in claim 9 wherein each stiffener means is comprised of one or more stacks of abutting flexible disks.

11. The combination as recited in claim 10 wherein some of the isolation-gaps are adapted to pass a relatively high cfm air flow and wherein the "outer" record-gaps are coupled to other respective isolation-gaps, exhibiting relatively moderate cfm; with the "inner" record-gaps coupled to respective ones of these high-cfm isolation-gaps.

12. The combination as recited in claim 11 wherein said "high-cfm" isolation-gaps are provided with respective spacers of relatively large height.

13. A method of rendering a floppy disk memory module including a stack of spaced flexible record disks, plus a dummy pack and stiffener means at each axial end, each dummy pack comprising a like array of spaced floppy dummy disks, the steps of:

expanding each dummy pack and providing sufficient separation air thereto to accommodate effective isolation of the record disks and maintain relatively uniform gaps therebetween;

while supplying separation-air to all inter-disk gaps at relatively moderate cfm; and supplying partition air to the record-gaps so as to favor "outer-gaps", i.e., those at or adjacent the axial ends of the record stack, with higher cfm.

14. The method of claim 13 also including the steps of:

coupling each record-gap between record-disks to a respective dummy-gap between dummy-disks so as to receive air in common.

15. The combination as recited in claim 14 wherein the dummy gaps are made to vary in height between a maximum height and a minimum height; and wherein said "outer" record-gaps are so-coupled to dummy-gaps of maximum height, while "inner" record-gaps are so-coupled to dummy-gaps of minimum height, whereby to enable the supply of partition air at relatively moderate cfm which so favors "outer" record-gaps apportioning a greater percent cfm thereto at the expense of the dummy-gaps coupled thereto.

16. In an improved rotatable memory module comprising a stack of like-spaced flexible record disks stacked along a common axis to be co-rotated and adapted to be pneumatically separated and partitioned, at moderate cfm, plus a pair of stiffener means, one at either end of the stack, and also a pair of like isolation packs, each adapted to be pneumatically separated and disposed between a stiffener means and the adjacent end of the record stack, each isolation pack comprising a stack of spaced flexible isolation disks arranged along said axis to be co-rotated with the record stack in an isolation stack sufficiently long and sufficiently pair-pressurized to avoid interference with the record disks;

the combination therewith of means adapted to supply partition air differentially with increased cfm to "outer" record-gaps, i.e., those between record disks at, or near, the outer, axial end of the record stack.

17. The combination as recited in claim 16 wherein record-gaps between respective record disks are pneumatically coupled to respective dummy-gaps via air supply conduits shared in common.

18. The combination as recited in claim 17 wherein the conduit system shared by "outer" record-gaps is adapted to apportion a greater percent of partitioning cfm thereto than the like system shared by other record-gaps.

19. The combination as recited in claim 17 wherein the dummy-gaps between respective dummy disks are provided with spacers of varying height; and wherein those dummy-gaps having spaces of minimum height are coupled to said "outer" record-gaps; while dummy-gaps having a maximum height are coupled to the "inner" recording-gaps.

20. The combination as recited in claim 19 wherein the coupling pattern for said gaps is arranged to separate the coupled gaps as much as possible.

21. The combination as recited in claim 20 wherein the record stack is conceptualized as halved into two similar upper and lower stack-halfs; and wherein the "upper" half-stack has its record-gaps coupled to the isolation-gaps of the axially remote, "lower" isolation pack;

while, similarly, the "lower" half-stack has its record-gaps so coupled to the isolation-gaps of the remote, "upper" isolation-stack.

22. The combination as recited in claim 21 wherein the "upper" half-stack has its uppermost record-gap coupled to the uppermost isolation-gap of the axially remote, "lower" isolation pack, and with each adjacent record-gap, proceeding downward, being coupled-in-order to a respective "lower" isolation-gap;

while, similarly, the "lower" half-stack has its uppermost record-gap so coupled to the uppermost isolation gap of the remote, "upper" isolation-stack, with each adjacent record-gap, proceeding downward, being so coupled, in-order, to a respective lower isolation-gap.

23. The combination as recited in claim 20 wherein said stiffener means comprises a stack of abutting flexible disks.

24. The combination as recited in claim 23 wherein separation air is provided through bores extending axially through the disk packs being formed by holes in the disks which are stacked in registry, there being rim means about such holes to span a gap with which they do not communicate and semi-rim means about the holes spanning a gap with which they do communicate.

25. The combination as recited in claim 24 wherein the spacer means between all of the disks comprise a pair of like annular washers, placed back-to-back and apertured to provide an orifice covering roughly the middle half of each associated gap.

26. The combination as recited in claim 25 wherein each disk pack comprises about 1–2 dozen like flexible disks; and wherein the memory module is provided with separation air at relatively moderate cfm being rotated at a relatively high rpm.

27. The combination as recited in claim 26 wherein this module is rotated at 2–3 thousand rpm or more; wherein each of the disks is about 1.5 mils in height and about 10 inches in diameter; wherein the spacers in the record-gaps are about 12 mils high and wherein the spacers in the dummy-gaps vary in height from about 8 mils to about 20 mils.

28. A floppy disk memory unit comprising a pack of like flexible recording disks stacked for co-rotation at relatively high rpm and separated a uniform distance, while also being adapted to be separated and partitioned pneumatically at moderate cfm, this unit including means for supplying separation and partition air thereto, this means being adapted to supply "outer" record-gaps, at or adjacent each axial end of the record pack, with partitioning air at relatively higher cfm.

29. The combination as recited in claim 28 wherein said record stack is flanked by a pair of like dummy packs, each comprising a stack of dummy disks separated and adapted for pneumatic separation and wherein said air supply means is adapted to deliver air to each record-gap and to a respective dummy-gap coupled-in common thereto, delivering a relatively uniform "high-cfm" air pulse to each pair of gaps in its Partition Mode, with the "outer" recording-gaps being adapted to draw a relatively high percentage of this "high-cfm" pulse, while the "inner" recording-gaps draw a relatively smaller percentage thereof.

30. The combination as recited in claim 29 wherein said dummy-gaps are established by spacers which vary in height from a maximum to a minimum height; and wherein the "maximum height" dummy-gaps are coupled to said "outer" recording gaps.

31. The combination as recited in claim 30 wherein a like stiffener means is provided outboard of each dummy pack, being comprised of abutting flexible disks.

32. The combination as recited in claim 31 wherein said separation and partition air is provided to each pair of coupled gaps by way of respective bores cut axially through the stacked disks.

33. The combination as recited in claim 32 wherein said bores are provided with rim means spanning the inter-disk gaps with which they do not communicate and with semi-rim means spanning the gaps with which they are intended to communicate.

34. The combination as recited in claim 33 wherein said recording pack is conceptualized into an "upper half-pack" and a "lower half-pack"; and wherein the "upper half-pack" has the gaps thereof coupled in order to respective dummy-gaps of the "lower" dummy pack, while the "lower half-pack" has its gaps similarly coupled, vertically in order, to the dummy-gaps of the "upper" dummy pack.

35. The combination as recited in claim 34 wherein the partitioning air is provided at a constant moderate cfm through all the recording-gaps.

36. The combination as recited in claim 35 wherein each disk pack comprises about 1–2 dozen like flexible disks; and wherein the memory unit is provided with separation air at relatively moderate cfm being rotated at a relatively high rpm.

37. The combination as recited in claim 36 wherein this unit is rotated at 2–3 thousand rpm or more; wherein each of the disks is about 1.5 mils in height and about 10 inches in diameter; wherein the spacers in the record-gaps are about 12 mils high with 6 mil central orifices, and wherein the spacers in the dummy gaps vary in height from about 8 mils to about 20 mils.

38. The combination as recited in claim 36 wherein said dummy packs are identical and provided of a size affording sufficient isolation and separation air to maintain its dummy-gaps open, while still isolating the record disks from disturbing influences of the dummy pack and adjacent stiffener means.

39. A floppy disk module including a stack of spaced flexible record-disks, plus two dummy packs, one at each axial end of the record stack, along with a pair of stiffener plates one outboard of each dummy pack, each dummy pack comprising a like array of spaced floppy dummy-disks, sufficient to accommodate isolation of record disks from the adjacent plate; and, combined therewith;

air delivery means adapted to supply all inter-disk gaps with sufficient separation air to hold them open when the module is rotated at a prescribed minimum rpm, this delivery means being also adapted to supply a burst of partition-air to any selected record-gap, between record disks, on command, while supplying relatively more cfm to "outer" record gaps, i.e., those at the outer axial ends of the record stack.

* * * * *